Aug. 6, 1957  R. E. VAN WAGNER  2,801,653
SAW CHAIN WITH DETACHABLE CUTTERS
Filed May 20, 1953  3 Sheets-Sheet 1
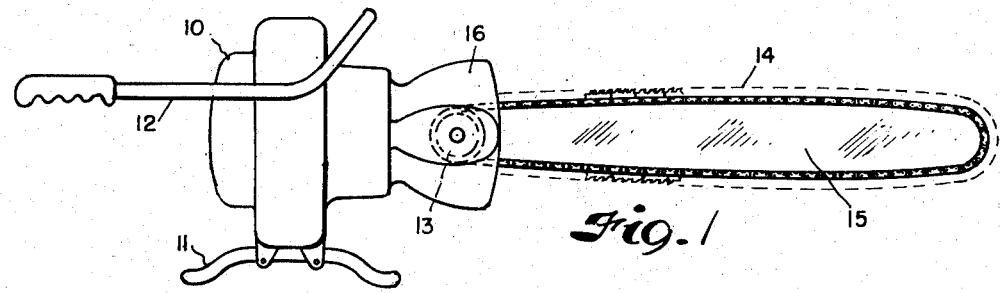
Fig. 1
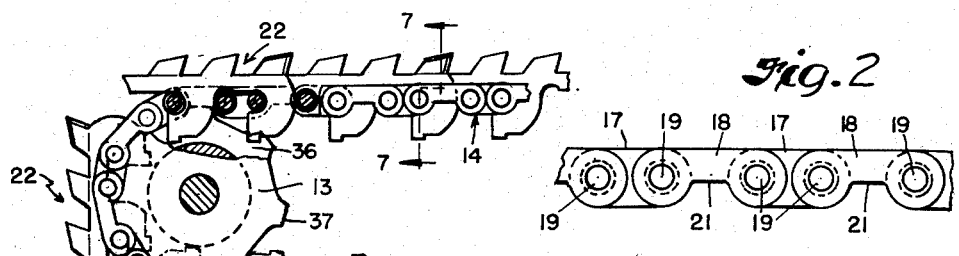
Fig. 2
Fig. 4
Fig. 3
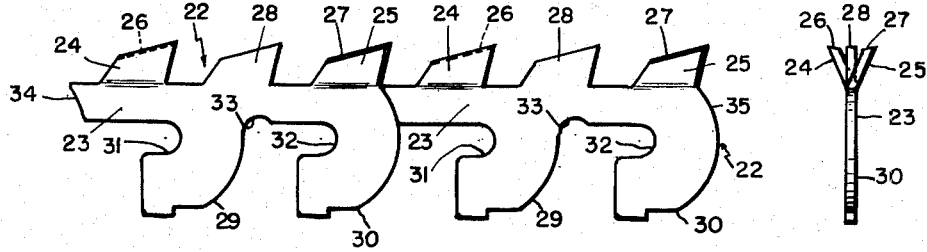
Fig. 5
Fig. 6
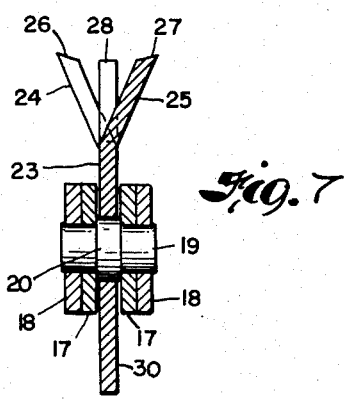
Fig. 7
INVENTOR.
ROLLO E. VAN WAGNER
BY
Oberlin & Limbach
ATTORNEYS.

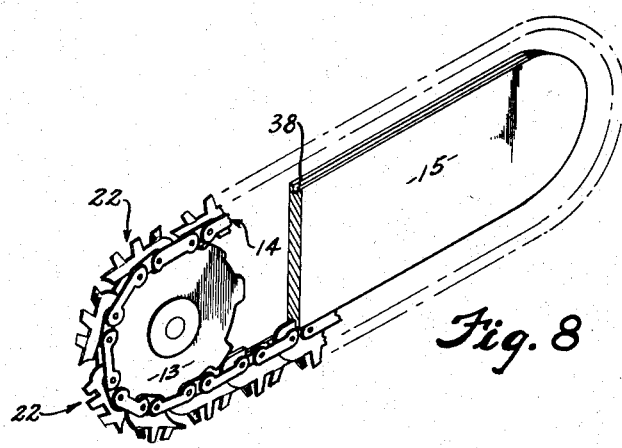
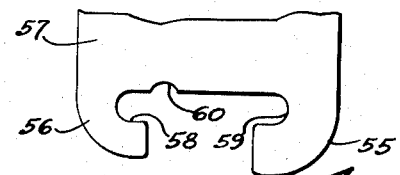
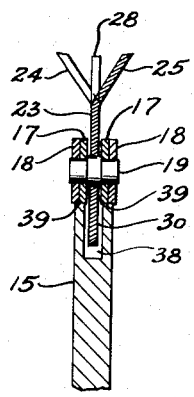
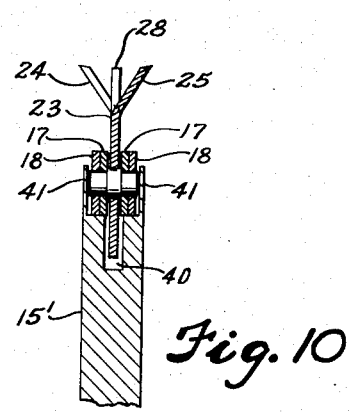

Aug. 6, 1957     R. E. VAN WAGNER     2,801,653
SAW CHAIN WITH DETACHABLE CUTTERS
Filed May 20, 1953     3 Sheets-Sheet 3

INVENTOR.
ROLLO E. VAN WAGNER
BY Oberlin + Limbach
ATTORNEYS.

United States Patent Office 2,801,653
Patented Aug. 6, 1957

2,801,653

SAW CHAIN WITH DETACHABLE CUTTERS

Rollo E. Van Wagner, New Haven, Ohio, assignor to The Fate-Root-Heath Co., Plymouth, Ohio, a corporation of Ohio Application May 20, 1953, Serial No. 356,207

8 Claims. (Cl. 143—135)

This invention relates, as indicated, to chain saws and more particularly to improvements in the nature and construction of the cutting elements of such a saw.

A primary object of my invention is to provide a chain saw having plural cutting element inserts which are distinct from and detachably connectible to the chain, whereby cutting elements of varying design may be substituted as desired for different cutting operations without disrupting the chain structure. Replacement of broken and worn out cutting elements is likewise greatly facilitated, and, furthermore, since the cutting elements and chain are manufactured separately, each may be given the optimum metallurgical characteristics for its particular intended function, thereby providing a saw of superior operating performance and durability.

Another object of the invention is to provide a chain saw having a plurality of cutter inserts independently removably connected to the chain, wherein each insert has two or more cutting teeth, such inserts thereby being individually effective to establish the desired kerf width.

It is also an object of my invention to provide such a cutter insert having guide portions operative to hold the same rigidly in place in the chain and to prevent the chain from leading off to one side or the other of its proper course.

Another object is the provision of cutter inserts of this nature which may be interlocked when connected to the chain in a manner preventing chatter and jump of the chain in use and forming an anti-back bend cutting chain device.

It is a further object to provide a chain saw wherein a drive sprocket wheel is operative simultaneously to engage longitudinally adjacent links of the chain, thereby providing a positive drive with an even distribution of the driving force.

An additional object is the provision of a chain saw having plural removable cutter inserts and including such a sprocket wheel, wherein the wheel is provided with a circumferential aligning groove operative to guide the inserts as they pass around the wheel.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevation view of a complete chain saw assembly equipped with cutting elements of my improved construction;

Fig. 2 is an elevational view of a longitudinal section of the chain;

Fig. 3 is a plan view of the Fig. 2 chain section;

Fig. 4 is a partial view in elevation showing details of the chain and chain drive structure, as well as the cutter insert design, portions of the chain and drive sprocket wheel being broken away;

Fig. 5 is a side elevation of two of my cutter inserts arranged in the manner in which they are connected to the chain;

Fig. 6 is an end view of one of the Fig. 5 cutter inserts;

Fig. 7 is a vertical section as viewed from the plane of line 7—7 in Fig. 4;

Fig. 8 is a perspective view of the drive sprocket wheel and guide bar as they appear removed from the saw assembly.

Fig. 9 is a fragmentary vertical section generally similar to that of Fig. 7 but additionally showing the guide bar;

Fig. 10 is a like vertical section of a slightly modified form of guide bar;

Fig. 17 is a fragmentary view in elevation of an insert provided with attaching ears of a different form.

Figure 11:
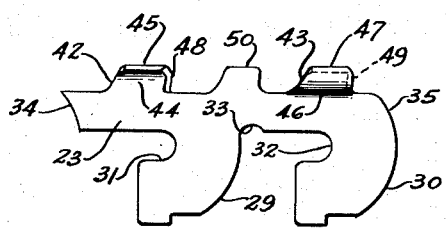
Fig. 11 is an elevational view of an insert of slightly differing form in that the cutter teeth are of chisel type.

Referring now to the drawings in detail, the complete assembly of Fig. 1 will serve to illustrate the general appearance and organization of parts of a current model chain saw, it being understood, however, that my improvements are in no way limited to use with this particular model.

The portable, one-man saw shown in Fig. 1 comprises a body portion in the form of a housing 10 provided with supporting feet 11 and a handle bar 12, the latter permitting the operator to steady and guide the saw in use. Located within housing 10 is a gasoline engine or an electric motor, not shown, which constitutes the source of power for the saw, and suitably connected thereto is a sprocket wheel 13 operative to drive the endless chain indicated generally by reference numeral 14. The chain is supported by and movable about the periphery of the forwardly projecting guide bar 15 attached to the saw body portion, and, of course, carries the cutter elements of the saw. A shield 16 is provided to surround and protect the drive end of the chain.

In accordance with my invention, the chain is separate from the cutting elements and is preferably of roller-type having a series of roller-supporting links 17 alternating with a series of connecting links 18. As best shown in Figs. 2 and 3, each parallel pair of links 17 supports two transverse pins 19 upon which rollers 20 are rotatably mounted. The pins 19 further pivotally join links 17 and 18 in longitudinally overlapped relation, and the lower or inner longitudinal edges of links 18 are recessed as shown at 21 for a purpose to be described below.

Connected to the chain are plural cutter inserts indicated generally at 22 of such construction that they may readily be installed in and removed from the chain. Each such insert has a flat elongated body portion 23, and, in the construction shown in Figs. 1–10, three teeth projecting from the upper longitudinal edge of this portion in spaced apart relation therealong. The end teeth 24 and 25 are provided with knife edges 26 and 27, respectively, to operate as cutting teeth, and these teeth are set by being bent in opposite directions outwardly of the plane of portion 23. The inclination of the cutting teeth will, of course, be dependent upon the kerf width desired. Middle tooth 28 extends within the plane of portion 23 to act as a clearing or raker tooth operative to dislodge the severed fiber of the kerf.

While I have shown each such insert provided with two cutting teeth, it will be apparent that the number of teeth may vary, at least two, however, being preferred so that each insert in itself is effective to maintain the set and establish the desired kerf width. The cutting teeth are given a suitable pitch and project outwardly beyond the respective sides of the chain in order to permit movement thereof through the article being cut.

Extending from the lower longitudinal edge of each cutter portion 23 are two spaced attaching ears 29 and 30 which lie within the plane of such portion and are shaped to extend rearwardly. These ears, respectively defining slots 31 and 32, are adapted partially to encircle the rollers of the chain, and in order to permit the inserts to be readily inserted and removed, they are spaced to engage alternate rollers. It will be clear that by bending inwardly the links between thus encircled rollers, the respectively associated insert may slide longitudinally into and out of engagement with the chain. The lower edge of portion 23 is further provided with a recess 33 between the two attaching ears to facilitate passage of the insert around the drive sprocket wheel. Each ear is notched at its lower edge as shown to provide a shoulder which will efficiently clear sawdust from the chain support, thereby to prevent clogging of the dust therein and jamming of the saw. If any insert becomes defective, it may easily be removed and replaced in short order since it is not necessary to remove links or otherwise modify the chain to accomplish the replacement.

As most clearly shown in Fig. 5, the inserts are constructed to overlap in endwise abutting relation when connected to the chain and for this purpose the trailing edge 34 and leading edge 35 of each insert are correspondingly curved rearwardly. By virtue of this construction, a chain equipped with these inserts is prevented from flexing outwardly, thereby eliminating undesirable chatter and jump of the chain in operation. The interlock, of course, does not prevent the chain from being flexed forwardly when removed from its support to permit withdrawal and installation of the inserts.

The attaching ears 29 and 30 of the inserts are of such size that they extend interiorly of the course of the chain to form guide portions which in riding about the chain support stabilize the chain in motion by preventing any leading off to either side. The cutting action is closely controlled since the cutter inserts are maintained in definite alignment. Sprocket wheel 13, positioned in driving engagement with the chain at the inner end thereof, is provided with a circumferential groove 36 within which the attaching ears of the inserts ride and are guided in passing around this wheel. Recesses 33 accommodate the slight outward movement of the rollers intermediate those encircled by each insert which results when the chain bends about the wheel.

As noted in the above, the connecting links 18 of the chain are provided with recesses 21 in the inner longitudinal edges thereof. These recesses form lateral surfaces on such links which coincide with the ends of the adjacent roller-supporting links 17, as shown, and the wheel 13 is provided with a plurality of peripheral teeth 37 of such shape that they will engage in the recesses. The wheel teeth, therefore, simultaneously contact adjacent pairs of parallel links and, in this manner, the driving force is evenly distributed to all links, thereby minimizing wear.

The manner in which the chain is supported and guided in operation is shown in more detail in Figs. 8 and 9, from which it will be seen that guide bar 15 is provided with a peripheral groove 38 aligned with the groove 36 of the drive sprocket wheel. Attaching ears 29 and 30 are received in groove 38, thus maintaining alignment of the inserts, while the chain is supported throughout substantially its entire length by engagement with outer edges 39 of the bar. The width of the bar is, of course, less than the lateral extent of the cutting teeth 24 and 25 so that the bar may pass through the work to be cut. A slightly modified form of guide bar is shown in Fig. 10 wherein the bar 15' is provided with a stepped groove 40, the chain links being supported on the resultant step. In this form, edge portions 41 of the bar partially overly the chain sides to afford an increased lateral stability.

In Figs. 1–10, I have shown inserts provided with flat, side cutting or slitting teeth 24 and 25, which are adapted to cut two parallel slits in the wood while the fiber therebetween is removed by the raker teeth in known manner. It will be obvious, however, that the principles of my invention are not limited to the use of any specific type of cutting teeth, and that any tooth form found suitable for chain saw use may be provided on the inserts. Thus, in Fig. 11, I have shown an insert which resembles the previously described insert in all respects, save in the design of the teeth. Whereas the teeth 24 and 25 are flat slitting teeth, the correspondingly positioned teeth 42 and 43 of this modified insert are generally hook-shaped to form chisel teeth of right and left hand configuration.

Figure 12:
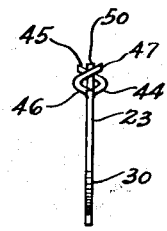
Fig. 12 is an end view of the Fig. 11 insert.

The tooth 42, which is of right hand configuration as viewed from leading edge 35, has a shank 44 directed outwardly and upwardly relative to insert portion 23 and a reversely curved toe 45 which extends to the opposite side of such portion; tooth 43 similarly comprises a shank 46 and an integral toe 47, this tooth however being of left hand configuration. Chisel edges 48 and 49 are respectively formed on the forward edges of teeth 42 and 43, on both toe and shank, and flat tooth 50 located intermediate the cutting teeth serves to remove sawdust and also as a depth gauge to limit the depth of cut. The chisel teeth 42 and 43 may terminate at their free edges in substantially the same plane, but I prefer that such edges overlap each other somewhat so that successive cuts in the kerf will be overlapped. This overlap is shown in exaggerated fashion in Fig. 12. Depth gauge 50 functions in expected manner and is so proportioned relative to the teeth chisel edges that the bite thereof will be controlled to desired degree.

Figure 13:
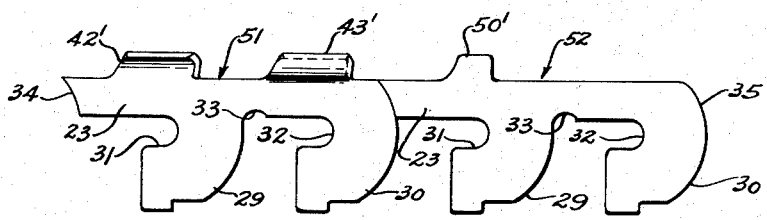
Fig. 13 is a view in elevation showing an insert provided with two chisel teeth, the raker and depth gauge, however, being carried by a separate adjacent insert.
Figure 14:
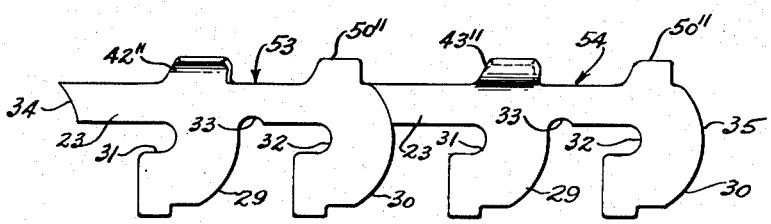
Fig. 14 is an elevational view of two further inserts, each having a single chisel tooth and a depth gauge, the two teeth being of right and left configuration.
Figure 15:
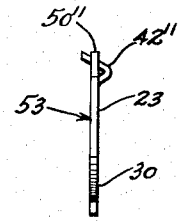
Figs. 15 and 16 are end views, respectively, of the two inserts shown in Fig. 14.
Figure 16:
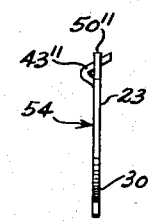

A further possible modification of my inserts is shown in Fig. 13 wherein the insert indicated generally at 51 is provided with two chisel teeth 42' and 43' similar to the teeth of the Fig. 11 insert. In this form, however, the teeth 42' and 43' are of larger size and the insert does not include a depth gauge. If it is desired to use a depth gauge with this type of insert, an insert of the nature indicated at 52 may be attached to the chain at proper intervals along with the inserts 51. Depth gauge insert 52 has a single, flat tooth 50' comparable to tooth 50 of the insert shown in Fig. 11. While it is preferred that inserts equipped with chisel teeth have at least two cutting teeth in order to maintain accurate set and kerf width, as discussed in connection with the inserts shown in Figs. 1–10, this feature is not essential to the other noted advantages of my construction, and, if desired, inserts such as shown at 53 and 54 in Figs. 14–16 may be used. The insert 53 is equipped with a right hand chisel tooth 42" and a depth gauge 50" positioned in operative advance thereof, while insert 54 has a left hand chisel tooth 43" and a like depth gauge 50". Inserts of this type will be alternately set in the chain. It will be understood that all chisel teeth are of the nature described in detail in connection with Fig. 11.

It will be apparent from the foregoing that my improved construction provides a chain saw which may readily be converted from one type of cutting operation to another by the simple substitution of cutting elements of correspondingly different design. The cutting inserts may be subjected to those heat treating operations effective to produce maximum cutting efficiency without any impairment of the chain structure or need for manufacturing compromise.

Not only is the tooth design susceptible of variation, but the specific manner of attachment of the inserts may be varied, for example, by the use of attaching ears such as shown in Fig. 17. In this modified construction, the forward ear 55 is curved rearwardly while the somewhat smaller trailing ear 56 curves forwardly. Thus, these ears face each other, rather than extending in the same direction as in the previously described inserts. Body portion 57 of such a modified insert is generally similar to portion 23 of the other inserts, and recesses 58, 59 and 60 serve the functions of the above-described recesses 31, 32 and 33, respectively. This type of insert may be inserted in and disengaged from the chain in the same manner as an insert having ears 29 and 30 and may likewise be equipped with working teeth of any suitable design. It will be clear that inserts of the Fig. 17 variety should be uniformly spaced in the chain to afford the desired flexibility.

The term "cutting" where used herein as descriptive of the insert teeth is intended in its common, rather than in any technical, sense, and refers broadly to the tooth function without regard to specific design.

Other modes of applying the principle of the invention may be employed, change being made as regards the details described, provided the features stated in any of the following claims, or the equivalent of such, be employed.

I therefore particularly point out and distinctly claim as my invention:

1. A chain saw comprising a chain having a series of links pivotally joined by transverse link connectors, a plurality of elongated cutter inserts adapted to be detachably connected to said chain, each such insert having a pair of longitudinally spaced apart cutting teeth provided with knife-edges and a raker tooth intermediate such cutting teeth, the cutting teeth of each insert being alternately set at an angle to the plane of movement of said chain and the raker teeth lying generally within such plane, whereby each cutter insert is effective to establish the desired kerf width, and attaching ears depending from each insert adapted partially to encircle alternate connectors of said chain, the leading and trailing edges of said inserts being correspondingly curved to provide overlapping contact between adjacent inserts.

2. A chain saw comprising a chain having a series of links pivotally joined by transverse link connectors, a plurality of elongated cutter inserts adapted to be detachably connected to said chain, each such insert having a pair of longitudinally spaced apart cutting teeth provided with knife-edges and a raker tooth intermediate such cutting teeth, the cutting teeth of each insert being alternately set at an angle to the plane of movement of said chain and the raker teeth lying generally within such plane, whereby each cutter insert is effective to establish the desired kerf width, and attaching ears extending from each insert adapted partially to encircle connectors of said chain with at least one link connector of the chain intermediate those thus engaged by the ears, the leading and trailing edges of said inserts being shaped to provide overlapping contact between adjacent inserts.

3. A chain saw comprising an endless chain having a series of links pivotally joined by transverse link connectors, support means engaging said chain interiorly over substantially the entire extent thereof, and a plurality of cutter inserts structurally distinct from said chain and removably engaged with the connectors thereof, each such insert having a wood-cutting tooth which extends laterally beyond a side of said chain and a pair of hook-shaped projections adapted partially to encircle spaced link connectors of said chain with at least one connector between those thus engaged by the insert.

4. A chain saw comprising an endless chain, support means engaging said chain interiorly over substantially the entire extent thereof, and a plurality of cutter inserts structurally distinct from said chain and removably engaged therein, each such insert having a wood-cutting tooth which extends laterally beyond a side of said chain and spaced attaching ears which engage the chain with at least one point of articulation of the chain therebetween.

5. In a chain saw, a chain comprising a series of links pivotally joined by transverse connectors, a cutter insert detachably connected to said chain provided with spaced ear portions partially encircling alternate connectors, said insert carrying a cutting element which projects laterally of the chain, and means supporting the effective cutting length of said chain operative to stabilize the same laterally by engagement with such ear portions.

6. In a chain saw, a chain comprising a series of links pivotally joined by transverse connectors, a cutter insert detachably connected to said chain having a cutting element which projects laterally beyond the chain and spaced ear portions partially encircling alternate connectors, the intervening connectors being movable out of alignment with such alternate connectors, thereby to permit such ear portions to be engaged and disengaged with such alternate connectors, and means supporting the effective cutting length of said chain operative to stabilize the same laterally by engagement with such ear portions.

7. A cutter insert adapted removably to be engaged in a self-supporting chain including transverse link connectors, comprising, as integral portions, a flat body portion, a cutting tooth having a shank portion which extends from an edge of said body portion to one side thereof and a reversely directed terminal portion which extends to the other side of the body portion and is spaced from such edge, and a pair of hook-shaped projections extending in the same direction from the opposite edge of said body portion in spaced apart relation in the plane of the latter, said projections being adapted partially to encircle alternate link connectors of such chain, the edge of said body portion intermediate said hook-shaped projections being recessed to accommodate slight outward movement into the same of the chain connector between those thus engaged by the projections.

8. In a chain saw, a chain comprising a series of links pivotally joined by transverse connectors, and a plurality of cutter inserts structurally distinct from said chain and removably engaged therein, each such insert having at least two cutting teeth projecting from one edge thereof and spaced attaching ears at the opposite edge, said ears partially encircling spaced link connctors of the chain with at least one such connector between those thus engaged by the insert.

References Cited in the file of this patent

UNITED STATES PATENTS

| | | |
|---|---|---|
| 646,284 | Hilton | Nov. 27, 1900 |
| 677,095 | Nagel | June 25, 1901 |
| 1,339,091 | Benefiel | May 4, 1920 |
| 1,979,001 | Kankos | Oct. 30, 1934 |
| 2,351,112 | Day | June 13, 1944 |
| 2,354,781 | Stoltz | Aug. 1, 1944 |
| 2,485,962 | Entwisle | Oct. 25, 1949 |
| 2,488,343 | Standal | Nov. 15, 1949 |
| 2,583,243 | Tweedie | Jan. 22, 1952 |
| 2,589,914 | Wolf | Mar. 18, 1952 |

FOREIGN PATENTS

| | | |
|---|---|---|
| 114,670 | Sweden | Aug. 14, 1945 |